Sept. 30, 1969     L. V. JORGENSEN     3,469,753
FILM MOVEMENT MECHANISM
Filed Nov. 24, 1967     3 Sheets-Sheet 1

INVENTOR.
Lester V. Jorgensen
By William F. Pinkh
John E. Peely Jr. Attys

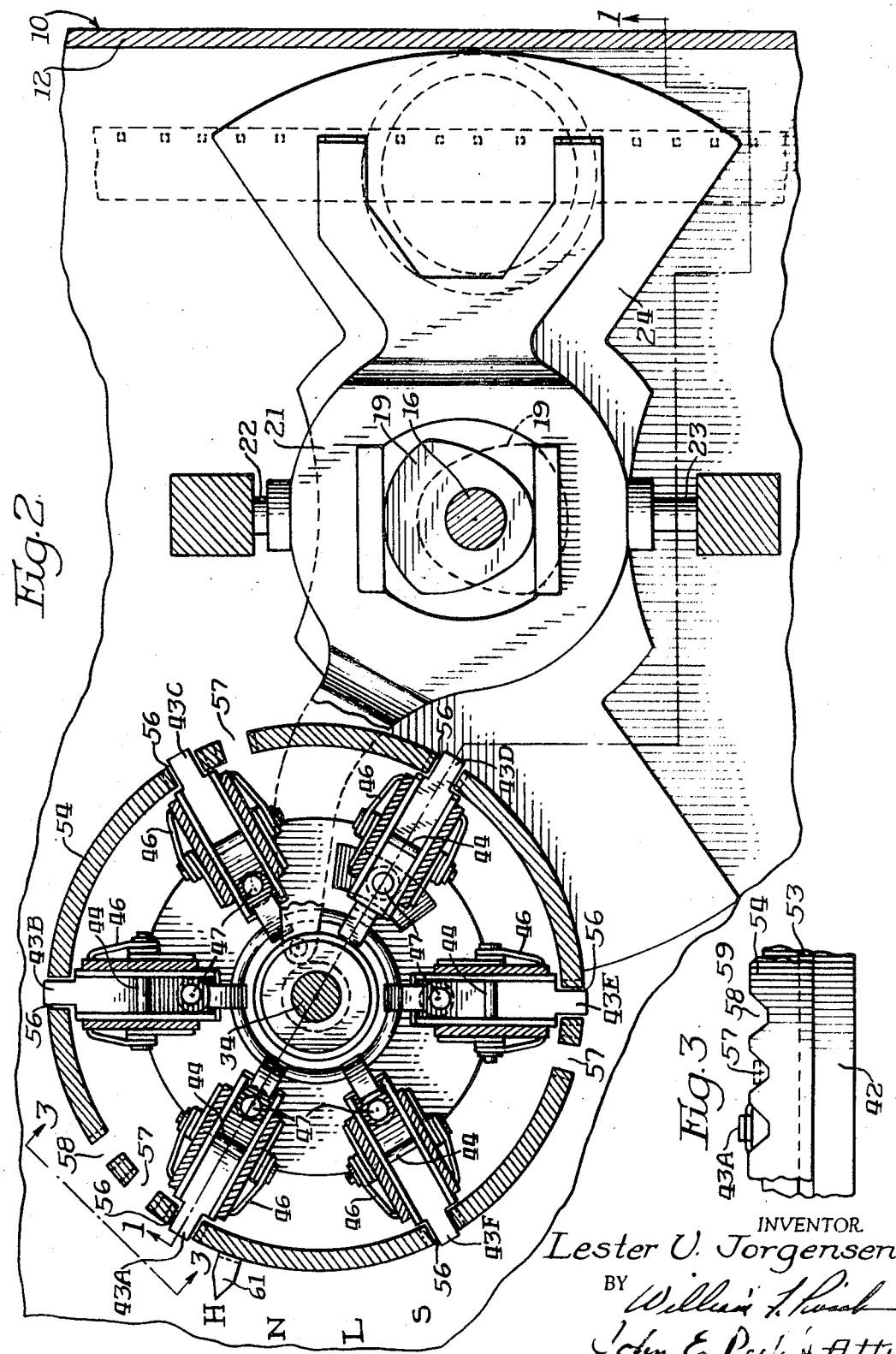

Sept. 30, 1969   L. V. JORGENSEN   3,469,753
FILM MOVEMENT MECHANISM
Filed Nov. 24, 1967   3 Sheets-Sheet 3
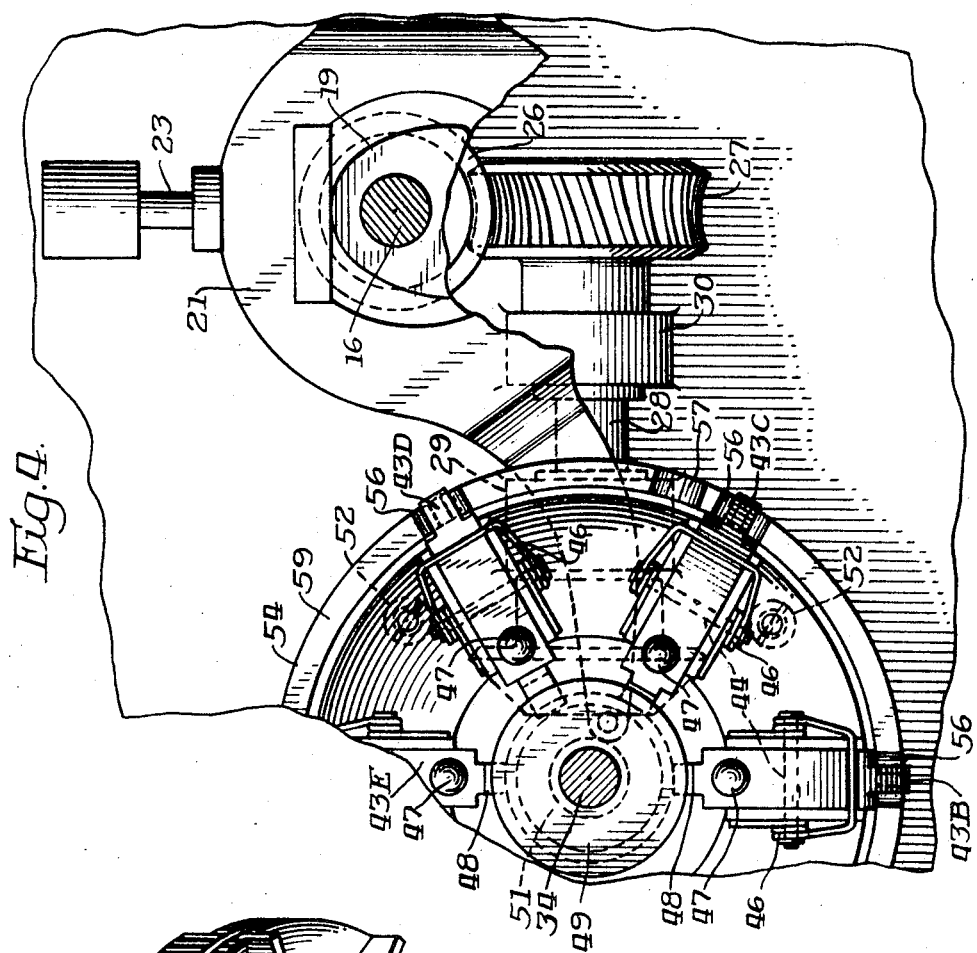
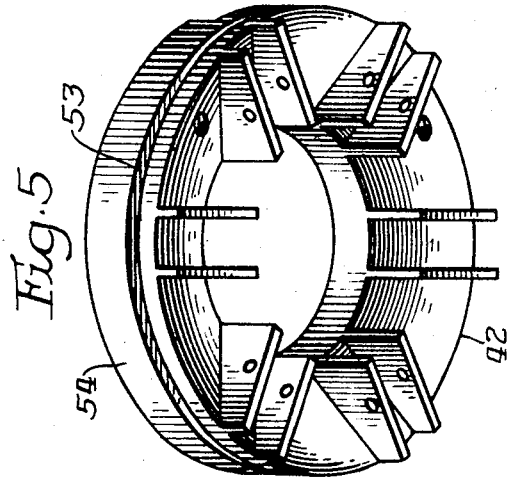
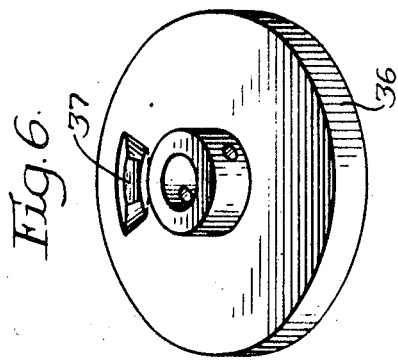
INVENTOR.
Lester V. Jorgensen

United States Patent Office 3,469,753
Patented Sept. 30, 1969

3,469,753
FILM MOVEMENT MECHANISM
Lester V. Jorgensen, Skokie, Ill., assignor to Bell & Howell Company, Chicago, Ill., a corporation of Illinois
Filed Nov. 24, 1967, Ser. No. 685,578
Int. Cl. G03b 1/22; B65h 17/40
U.S. Cl. 226—62     7 Claims

ABSTRACT OF THE DISCLOSURE

Disclosed is a film movement mechanism for a motion picture projector having a shuttle, adapted to move film through the projector's projection axis. The shuttle can be moved into and out of engagement with the film perforations by a plurality of cam followers at rates related to the rate of rotation of the projector's shutter, which is mounted on a shaft driven in synchronism with the shuttle. A cam is operatively connected to the shuttle. A control means is operatively connected to the shaft to actuate the shuttle into film perforations at selected frequencies determined by the position to which the control means is adjusted. Depending on the position of the control means, all, some, or none of the cam followers may cause the shuttle to enter film perforations during a given number of shutter revolutions.

---

This invention relates to a film movement mechanism and more particularly to a variable speed means for moving motion picture film through the projection axis of a film viewing apparatus.

Apparatus for moving a motion picture film through the projection axis of a film viewing device, such as a projector, is well known in the art. They normally comprise a means adapted to coact with the film to move the film. The coaction usually occurs near the projection axis of the projector. The means may comprise a shuttle having claws or teeth adapted to engage perforations in the film. As the shuttle moves in one direction, the claws move into engagement with perforations in the film and advance the film. On the return stroke, the claws are disengaged from the film perforations so that they do not move the film.

While devices of the foregoing nature have found widespread use, their operation under varying film speed requirements has not always been entirely satisfactory. In many situations, it is desirable to vary the rate of film movement. Slow film movement is particularly desirable so that a scene of interest can be viewed in greater detail. However, because many prior art devices have their film movement means coupled to their shutter means, such devices have been subject to an undesirable shutter flicker when running at slow film speeds. Specifically, projectors include a shutter to prevent a projector light from projecting an image during the time the film is moved. At normal operating speeds, the shutter operates fast enough so that no flicker is visible to the human eye. However, a flicker is seen when the shutter movement slows down. This objectionable flicker occurs in prior art devices because of the coupling between the shutter movement and the film movement. One prior art patent (U.S. Patent No. 3,212,849 to Roman et al.) illustrates one apparatus for solving this problem; however, that patent relates to a different apparatus solving the problem in a different manner.

Therefore, it is an object of this invention to provide a new and improved film movement mechanism.

It is also an object of this invention to provide a new and improved means for moving film at variable speeds wherein no undesirable flicker occurs when the film is slowed down or stopped.

It is a still further object of this invention to provide a new and improved projector film moving mechanism wherein the film may be stopped or may be moved at speeds that vary while the movement of the projector shutter is kept constant.

In addition, it is also desirable to speed up the film. In some cases, this is desirable to provide unique effects which occur when a film taken at one speed is speeded up. It may also be desirable to speed up film movement to more easily search the film for a desired section. The speeding up of film movement when the film movement mechanism is coupled to the shutter mechanism does not cause an undesirable flicker. However, it is still necessary that there be synchronism between film movement and shutter movement; that is, the shutter must cover the projector's aperture when the film is being moved.

Therefore, it is a further object of this invention to provide a new and improved film movement mechanism which can be speeded up as well as slowed down from a normal film movement speed, the shutter speed remaining constant.

In accordance with a principle of the invention, a film movement mechanism is provided wherein a shuttle, adapted to move the film through a projection axis, is moved into and out of engagement with the film perforations at speeds that are related to, but may be different from, the movement of the shutter. The mechanism includes a shaft having mounted thereon a shutter adapted to move through the projection axis. Also mounted on the shaft is a cam operatively connected to the shuttle. The cam is adapted to move the shuttle in synchronism with the movement of the shutter. Operatively connected to the shaft is a control means. The control means is adapted to move the shuttle into and out of engagement with the film perforation. The control means is controllable to vary the rate of engaging movement. Hence, even though the shuttle is adapted to move in synchronism with the shutter movement, it only moves the film when the control means moves it into engagement with the film. The rate of engaging movement of the control means may be set to any desired value.

It will be appreciated by those skilled in the art and others that the invention provides a simple mechanical means for varying the rate of movement of a movie film in a projector while maintaining the movement of the projector shutter at a constant speed.

Further and other objects will be apparent from the description of the accompanying drawings in which like numerals refer to like parts.

In the drawings:

FIGURE 2 is a vertical sectional view taken along the line 2—2 of FIGURE 1;

FIGURE 3 is an elevational view of a portion of the speed adjusting ring and particularly that portion indicated by the line 3—3 of FIGURE 2;

FIGURE 4 is a vertical cross-sectional view taken on the line 4—4 of FIGURE 1;

FIGURE 5 is a perspective view of the cam follower mounting member; and

FIGURE 6 is a perspective view of the in-and-out cam.

Figure 1:
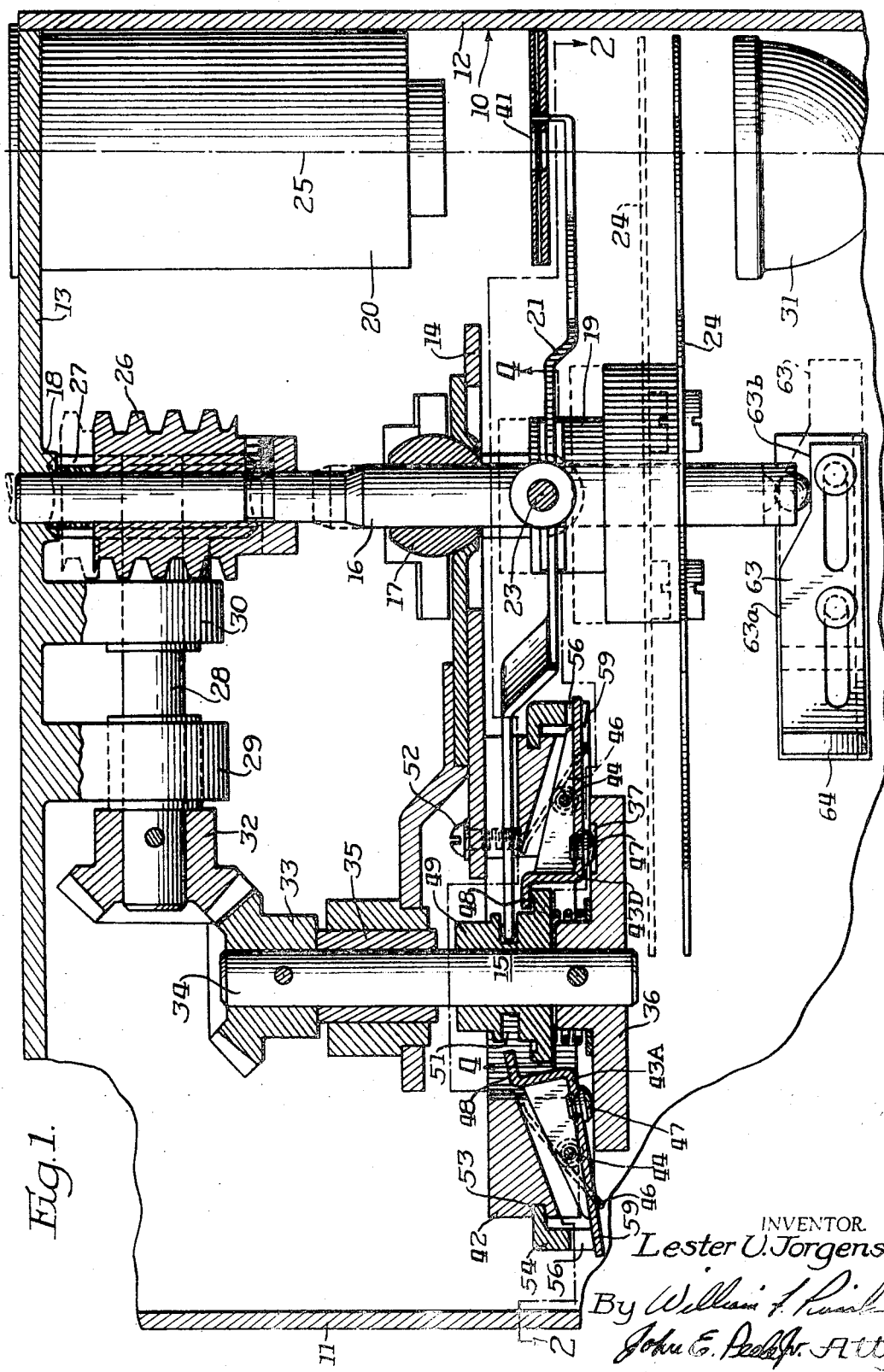
FIGURE 1 is a horizontal sectional view through the film moving mechanism taken on the line 1—1 of FIGURE 2.

As illustrated in FIGURES 1 and 2, the projector comprises a housing generally indicated at 10 having side walls 11 and 12 and a front wall 13. Parallel to the front wall 13 is an intermediate vertical wall 14 which serves as the mounting plate for most of the film movement mechanism of the invention.

The film movement mechanism of the invention generally comprises a main shaft 16, a reciprocating shuttle 21, a control structure generally indicated at 15, and a dual bladed shutter 24. The main shaft 16 serves as the up-and-down cam shaft and is journalled in a bearing mount 17 and in a boss 18. The bearing mount 17 is preferably affixed to the vertical wall 14 and the boss 18 is preferably formed as a part of the front wall 13. Affixed to the main shaft is a heart-shaped gravity cam 19. An aperture in the reciprocating shuttle 21 is mounted over the cam and coacts with the cam to cause a vertical reciprocating movement or stroke of the shuttle as viewed in FIGURE 2. The length of the stroke is equal to the distance between adjacent perforations in the film. The shuttle has a pair of arms with attached claws adapted to engage the film perforations. The shuttle 21 vertically slides upon and pivots about a pair of pins 22 and 23. Through appropriate mounting structure, the pair of pins are anchored to the vertical wall 14.

Also affixed to the shaft 16 is the dual bladed shutter 24. The blades of the shutter pass through the projection axis 25 of the projector. The projection axis is defined by the axis of the projector's projection lens 20. Located along the projection axis 25 on the inner side of the projection lens 20 is the projector aperture 41 and the projector lamp 31. One blade of the shutter serves to cover the aperture 41 of the projector while film movement takes place; the other blade of the shutter serves as a flicker blade which covers the aperture when no film movement is taking place.

Illustrated in FIGURE 1 is a means for conveying power from the main shaft 16 to the control structure 15. This mechanical power conveying means generally comprises a worm 26, a worm wheel 27, a first shaft 28, a first bevel gear 32, a mating bevel gear 33, and a second shaft 34. The worm 26 is preferably set screwed to the main shaft 16 at a point adjacent the boss 18. The worm meshes with the worm wheel 27 fixedly attached to one end of the first shaft 28. The first shaft 28 is rotatable in bearing members 29 and 30 extending from the front wall 13. At the other end of the first shaft 28, the first bevel gear is affixed. The first bevel gear meshes with the mating bevel gear 33 which is affixed to the second shaft 34. The second shaft 34 is the in-and-out cam shaft of the film movement mechanism.

Preferably, the ratio between the worm 26 and the worm wheel 27 is 6:1 so that for every six revolutions of the main shaft 16, one revolution of the in-and-out cam shaft 34 takes place. Although the film shuttle 21 is being reciprocated vertically at a frequency of the order of 36 movements per second, film will not be fed through the projector unless the claws of the shuttle 21 are brought into engagement with the film perforations. This is accomplished by pivoting the shuttle 21 about the pins 22 and 23 as hereinafter described.

Affixed to the opposite end of the in-and-out cam shaft 34 is an in-and-out face cam 36 (FIGURE 6) having a cam depression 37 formed in its operating face. The in-and-out cam shaft 34 is rotatably mounted in a bearing 35 which, through additional mounting structure, is affixed to the vertical wall 14.

The control structure 15 of the invention is best illustrated in FIGURES 2 through 6. The control structure generally comprises a ring-like member 42 (FIGURE 5) serving as the mounting for a series of six cam followers 43A, 43B, 43C, 43D, 43E, and 43F. The cam followers, which extend radially from the second shaft 34, are mounted for pivotal movement on pins 44 (FIGURE 2), and are spring urged against the face cam 36 by springs 46. Each of the cam followers 43 has an operating button 47 riveted thereto, each button being in radial alignment with the cam depression 37 in the face cam 36. Each cam follower also has an end 48 which is adapted to contact a collar member 49. The collar member 49 is axially slidable on the in-and-out cam shaft 34. Further, the collar member has an annular groove 51 in which the end of the shuttle 21 is adapted to ride. Thus, any cam follower 43 selectively adjusted to operate with the cam depression 37 causes an axial movement of the collar 49. Axial movement of the collar 49 effects pivotal movement of the shuttle 21 and thereby causes the claws of the shuttle to engage the film perforations to move a frame of film across the aperture 41 of the projector.

The selective adjustment of the cam followers is best illustrated in FIGURE 2. The ring-like member 42 is affixed to the vertical plate 14 by screws 52 (FIGURE 4). Mounted in an annular groove 53 of the ring 42 is an adjustment member 54 having radial cam notches 56, 57 and 58 formed in a rim 59. These cam notches are, as illustrated in FIGURE 3, generally V-shaped so that the cam followers can easily move into or out of them as the ring shaped adjustment member 54 is turned as hereinafter described. As seen in FIGURE 2 there are six notches 56, three notches 57 and one notch 58. These notches cooperate with the cam follower members 43A, 43B, 43C, 43D, 43E and 43F.

For purposes of illustration, a projector speed indicating means is illustrated in FIGURE 2 as comprising a pointer 61, affixed to the adjusting ring 54. An indicating scale on a fixed wall extending from the housing 10 cooperates with the pointer 61 to designate various speed relationship. The indicating scale has a letter H which indicates high and means that the cam notches 56 are lined up with each of the cam followers 43A–F. This line-up is such that as the cam depressions 37 pass beneath the followers, six in-and-out movements of the shuttle 21 occur per revolution of the in-and-out cam 36. Thus, the in-and-out frequency equals the up-and-down frequency of the film shuttle to get a relatively high rate of film feed across the aperture. The high film speed movement conditions is adapted for search purposes; for example, it allows the film to be rapidly moved through the projector to locate the desired film position. It will be appreciated that because of the six-to-one relationship between the worm 26 and the worm wheel 27, the H position will result in a film feed rate of 36 frames per second provided one frame is moved each time the shuttle is moved.

Movement of the adjusting ring 54 so that the pointer 61 is at the N or normal position places the notches 57 under the followers 43A, 43C and 43E. This condition results in three in-and-out movements of the shuttle 21 per revolution of the in-and-out cam 36 giving a film feed rate of 18 frames per second, this being the normal rate of film movement. The remaining cam followers 43B, 43D and 43F are held out of engagement with the cam depression 37 because an unnotched portion of the rim 59 is beneath them in this adjusted position. The unnotched portion prevents these cam followers from operating.

Movement of the cam ring 54 so that the pointer 61 is adjacent the L or low position places the notch 58 beneath the cam follower 43A. This positioning results in one in-and-out movement of the shuttle per revolution of the in-and-out cam 36. One in-and-out movement per revolution results in a projection film feed rate of 6 frames per second. Hence, this position is a low film movement position. In the L position, the remaining cam followers are all inoperative because unnotched portions of the rim 59 are beneath them.

A fourth adjusted position in which the pointer is opposite the letter S places unnotched portions of the rim 59 beneath each of the cam followers. In this position, no in-and-out movement of the shuttle 21 takes place. Hence, in the S position, any particular frame of a film may be displayed in a still position.

It is to be understood that while the in-and-out movement of the shuttle varies with the cam ring setting, the rate of revolving movement of the shutter 24 remains constant. Further, the up-and-down movement of the shuttle 21 is constant. It is the variation in in-and-out movement which brings the shuttle into cooperation with the film perforations to vary the rate of film feed. Because the shutter movement remains constant, no flicker occurs even though the film speed movement is varied from the high or 36 frame per second rate to the low or 6 frame per second rate. In fact, no flicker occurs even when the film is stopped so that a particular frame may be studied. At this time, the shutter continues passing through the aperture of the projector at the same rate as when film is being moved. However, the rate of movement of the shutter past the aperture is sufficiently fast so that no objectionable flicker occurs.

In addition to a means for moving the film in a forward direction, the apparatus illustrated in the drawings also includes a means to reverse the film movement direction. To achieve a reversal of the film movement direction, it is necessary to effect a 180° phase shift of the up-and-down cam 19 with respect to the in-and-out cam 36. This is illustrated in FIGURE 2 where the up-and-down cam 19 is shifted 180° as illustrated by the dotted lines. This shifting takes place by an axial movement of the shaft 16 and the worm 26 affixed thereto. The worm 26 rotates the worm wheel 27 and, through the gearing, the in-and-out cam an angular distance of 30°. Since there is a six-to-one gear ratio between the main shaft 16 and the in-and-out cam shaft 34, the shift in effect gives an effective 180° phase shift to the up-and-down cam 19. This is true since 6×30°=180°. After such shifting, the shutter blade previously referred to as the flicker blade now functions as the covering blade for the aperture while film feed is taking place; the other blade now functions as the flicker blade.

Axial shifting of the shaft 16 to reverse the film feed direction is accomplished by a manually operated cam slide 63 having an upstanding arm 64 which extends through the projector housing. When the cam slide 63 is moved to the right as illustrated in FIGURE 1, its step surfaces 63a, 63b cause axial shifting of the main shaft 16 so that the desired 180° shift is created. This axial shift can occur when the film is moving so that a sharp change from forward to reverse can occur to allow for ease of searching when a desired part of a film is being sought.

Although not shown, any suitable means may be used to apply power to the main shaft 16. For example, the shaft of a constant speed motor could be connected through gears to a power gear mounted on the main shaft 16.

It will be appreciated that the foregoing description has described a simple apparatus for varying the film movement rate of a projector or other film viewing apparatus without varying the rate of rotation of the shutter. The apparatus includes a main shaft means for moving a shutter and a shuttle in synchronism. Connected to the main shaft is a control structure adapted to move the shuttle into and out of engagement with perforations in the film. The frequency of in-and-out movement of the shuttle per revolution of the main shaft determines the rate of film movement during a complete cycle of operation. Hence, the rate of movement of the film is independent of the rate of movement of the shutter. Because of this independence, the shutter can be rotated at a sufficiently fast speed so that it does not cause a flicker when the film is being viewed on a screen, for example. Moreover, the rate of movement of the film can be selected at a rate above the normal rate or less than the normal rate, including a stopped position, without flicker problems.

While the foregoing description has described one simple embodiment of the invention, it will be appreciated by those skilled in the art that various structural changes are within the scope of the invention. Hence, it is to be understood that the invention may be practiced otherwise than as specifically described herein.

What is claimed is:

1. Apparatus for moving a motion picture film past an aperture in a film viewing device comprising:

a main shaft adapted to be revolved at a predetermined speed;

a shuttel having claw means adapted to move into and out of engagement with perforations in said film for moving said film;

first cam means mounted on said shaft and adapted to operatively coact with said shuttle to reciprocate said shuttle in the direction of film movement at the rate of revolution of said shaft, the distance of movement of said claw means being equal to the distance necessary to move one frame of said film past said aperture;

control means operatively connected to said main shaft for causing an engaging and a disengaging movement of said shuttle, said control means including a second cam means operative to move at a speed slower than said main shaft, having a contacting surface for contacting a plurality of cam follower means and including a plurality of cam follower means adapted to operatively coact with said shuttle means when said cam follower means are contacted by said contacting surface of said second cam means for moving said claw means into and out of engagement with the perforations in said film.

2. Apparatus as claimed in claim 1 wherein said second cam means comprises a face cam having a cam depression therein and wherein said plurality of cam follower means comprise a stationary ring-shaped member having mounted thereon a plurality of spring loaded members adapted to move against one face of said face cam, said spring loaded members also adapted to move into said cam depression to cause said movement of said shuttle means.

3. Apparatus as claimed in claim 2 wherein said face cam is mounted on a shaft which is operatively connected to said main shaft.

4. Apparatus as claimed in claim 3 including a collar mounted on the shaft on which the face cam is mounted and operatively connected to said spring loaded members and to said shuttle means so that said spring loaded members move said collar in a predetermined direction at predetermined periods, said collar movement causing said claw means to move into engagement with said film means.

5. Apparatus as claimed in claim 4 including a shutter operatively connected to said main shaft to revolve at the speed of said main shaft.

6. Apparatus as claimed in claim 5 including means to prevent said cam follower means from moving into engagement with said cam depression in said face means thereby providing means to vary the rate of engagement and disengagement movement of said claw means.

7. Apparatus as claimed in claim 6 wherein said means for preventing engagement of said cam follower means plurality of notches therein adapted to coact with said spring loaded members so that when said spring loaded members are coacting with said notches, they can move into and out of engagement with said face cam depression but when said spring loaded members do not co-act with said notches, they cannot move into and out of engagement with said face cam depression.

References Cited

UNITED STATES PATENTS

| 3,212,840 | 10/1965 | Roman | 226—62 X |
| 3,261,654 | 7/1966 | Faber | 226—68 X |

M. HENSON WOOD, Jr., Primary Examiner

RICHARD A. SCHACHER, Assistant Examiner

U.S. Cl. X.L.

226—165

UNITED STATES PATENT OFFICE
CERTIFICATE OF CORRECTION

Patent No. 3,469,753 September 30, 1969

Lester V. Jorgensen

It is certified that error appears in the above identified patent and that said Letters Patent are hereby corrected as shown below:

Claim 7, line 2, after "means" insert -- comprises a movable ring-shaped member having a --.

Signed and sealed this 15th day of September 1970.

(SEAL)
Attest:

Edward M. Fletcher, Jr.
Attesting Officer

WILLIAM E. SCHUYLER, JR.
Commissioner of Patents